US008473752B2

(12) United States Patent
Locker et al.

(10) Patent No.: US 8,473,752 B2
(45) Date of Patent: Jun. 25, 2013

(54) APPARATUS, SYSTEM, AND METHOD FOR AUDITING ACCESS TO SECURE DATA

(75) Inventors: Howard J. Locker, Cary, NC (US); David C. Challener, Raleigh, NC (US); Mark C. Davis, Durham, NC (US); Randall S. Springfield, Chapel Hill, NC (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 548 days.

(21) Appl. No.: 12/725,838

(22) Filed: Mar. 17, 2010

(65) Prior Publication Data

US 2011/0231671 A1    Sep. 22, 2011

(51) Int. Cl.
*H04L 29/06*    (2006.01)

(52) U.S. Cl.
USPC ............. 713/189; 713/157; 713/194; 726/22; 726/26; 726/27; 726/28; 726/29; 726/30; 380/284

(58) Field of Classification Search
USPC ........................................... 713/189
See application file for complete search history.

(56) References Cited

U.S. PATENT DOCUMENTS

| | | | |
|---|---|---|---|
| 4,588,991 A * | 5/1986 | Atalla ........................... | 713/165 |
| 7,305,564 B2 * | 12/2007 | Jin et al. ........................ | 713/188 |
| 2007/0300299 A1 * | 12/2007 | Zimmer et al. ................ | 726/22 |

OTHER PUBLICATIONS

Accorsi, Rafael. "Log Data as Digital Evidence: What Secure Logging Protocols Have to Offer?" 2009 33rd Annual IEEE International Computer Software and Applications Conference. 2009 IEEE.*

* cited by examiner

*Primary Examiner* — Taghi Arani
*Assistant Examiner* — Narciso Victoria
(74) *Attorney, Agent, or Firm* — Kunzler Law Group

(57) ABSTRACT

An apparatus, system, and method are disclosed for auditing access to secure data. A detection module detects an access to the secure data. A record module records an encrypted log entry describing the access to the secure data. A verification module verifies the secure data is securely stored.

12 Claims, 6 Drawing Sheets

APPARATUS, SYSTEM, AND METHOD FOR AUDITING ACCESS TO SECURE DATA

BACKGROUND

1. Field

The subject matter disclosed herein relates to audits and more particularly relates to auditing of access to secure data.

2. Description of the Related Art

Confidential information is frequently stored on data processing devices. For example, a database may store confidential personal information for an individual. This confidential information must be kept secure. Similarly, proprietary information is often required to be securely maintained. Confidential information, proprietary information, and other information that must be securely maintained are referred to herein as secure data.

Governmental and corporate regulations such as the Health Insurance Portability and Accountability Act of 1996 (HIPAA) often mandate secure storage of secure data. These regulations can include audit requirements. Unfortunately, there is no method for proving in an audit that unauthorized accesses have not been made to the secure data.

SUMMARY

Based on the foregoing discussion, the inventors have recognized a need for an apparatus, system, and method that audits access to secure data. Beneficially, such a method, apparatus, and system could verify that secure data had not been accessed by unauthorized users.

The embodiments of the present invention have been developed in response to the present state of the art, and in particular, in response to the problems and needs in the art that have not yet been fully solved by currently available secure data audit methods. Accordingly, the embodiments have been developed to provide an apparatus, system, and method for auditing access to secure data that overcome many or all of the above-discussed shortcomings in the art.

The apparatus for auditing access to secure data is provided with a plurality of modules configured to functionally execute the steps of the method. The modules include a detection module, a record module, and a verification module.

The detection module detects an access to secure data. The record module records an encrypted log entry describing the access to the secure data. The verification module verifies the secure data is securely stored.

A method is also presented for auditing access to secure data. A detection module detects an access to secure data. A record module records an encrypted log entry describing the access to the secure data. A verification module verifies the secure data is securely stored.

A system is presented for auditing access to secure data. The system may be embodied in a data processing system. In particular, the system, in one embodiment, includes a first secure storage device, a remote storage device, a detection module, a record module, and a verification module.

The first secure storage device stores secure data. The remote storage device is physically distinct from the first secure storage device. The detection module detects an access to the secure data. The record module records an encrypted log entry describing the access to the secure data to the remote storage device. The verification module verifies the secure data is securely stored.

References throughout this specification to features, advantages, or similar language do not imply that all of the features and advantages may be realized in any single embodiment. Rather, language referring to the features and advantages is understood to mean that a specific feature, advantage, or characteristic is included in at least one embodiment. Thus, discussion of the features and advantages, and similar language, throughout this specification may, but do not necessarily, refer to the same embodiment.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of the embodiments as set forth hereinafter.

BRIEF DESCRIPTION OF THE DRAWINGS

In order that the advantages of the embodiments will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Many of the functional units described in this specification have been labeled as modules, in order to more particularly emphasize their implementation independence. Modules may include hardware circuits such as one or more processors with memory, Very Large Scale Integration (VLSI) circuits, gate arrays, programmable logic, and/or discrete components. The hardware circuits may perform logic functions, execute computer readable programs stored on tangible, non-transitory computer readable storage medium, and/or execute programmed functions. Modules may also include a tangible, non-transitory computer readable storage medium storing a computer readable program that performs a function when executed by a hardware circuits such as a processor, microcontroller, or the like.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Figure 1:
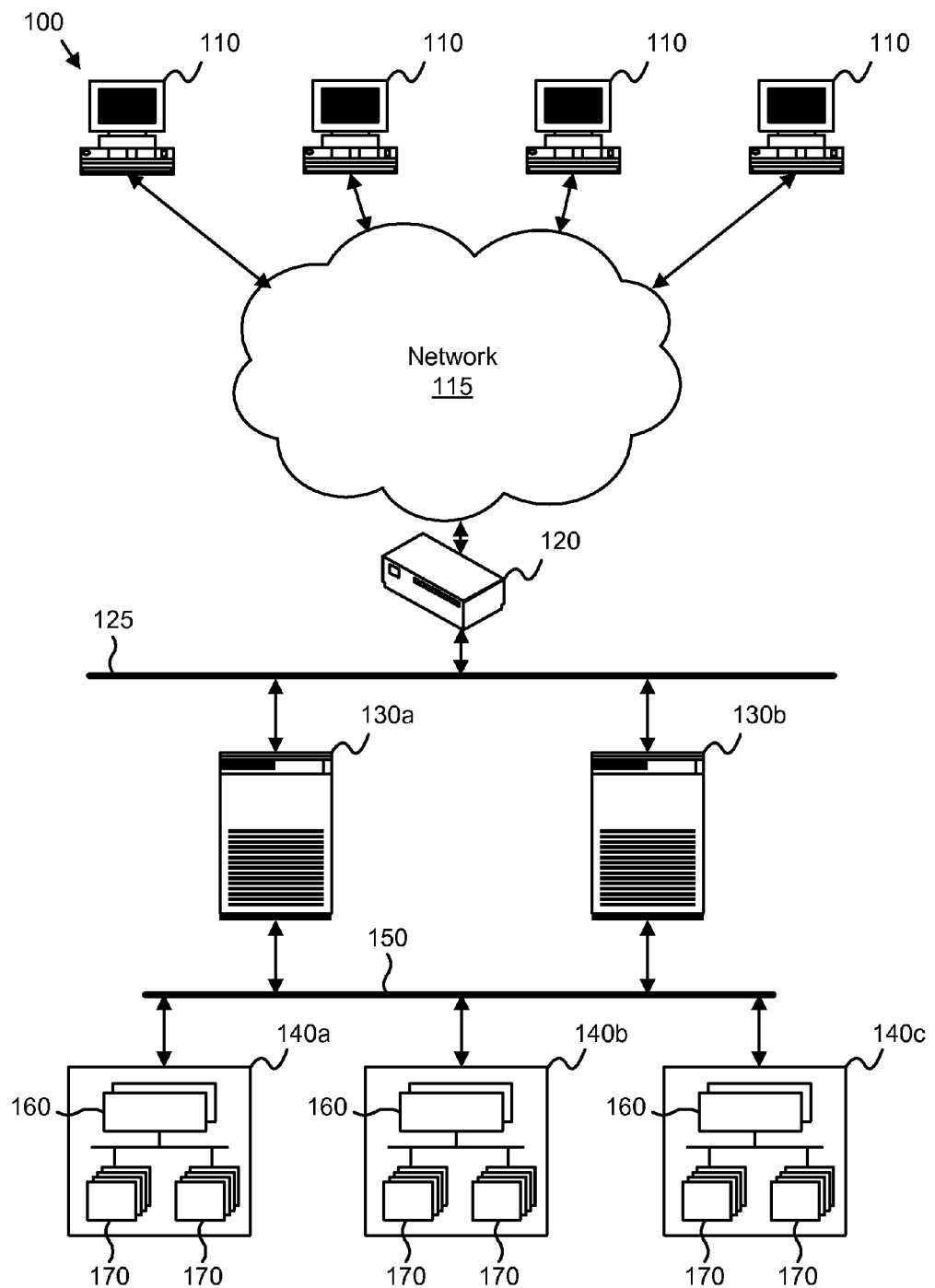
FIG. 1 is a schematic block diagram illustrating one embodiment of a data processing system.

FIG. 1 is a schematic block diagram illustrating one embodiment of a data processing system (DPS). The DPS 100 includes one or more client computers 110, a network 115, a router 120, an internal network 125, one or more servers 130, a storage communications channel 150, and one or more storage subsystems 140.

As used herein, the client computers 110 are referred to as clients 110. The servers 130 may also be configured as mainframe computers, blade centers comprising multiple blade servers, and the like. Although for simplicity four clients 110, one network 115, one router 120, one internal network 125, two servers 130, one storage communications channel 150, and three storage subsystems 140 are shown, any number of clients 110, networks 115, routers 120, internal networks 125, servers 130, storage communications channels 150 and storage subsystems 140 may be employed. One of skill in the art will also readily recognize that the DPS 100 could include other data processing devices such as bridges, scanners, printers, and the like.

Each storage subsystem 140 includes one or more storage controllers 160 and one or more storage devices 170. The storage devices 170 may be hard disk drives, optical storage devices, magnetic tape drives, micromechanical storage devices, holographic storage devices, and semiconductor storage devices. Alternatively, the storage device 170 may also be configured as a just a bunch of disks (JBOD), a redundant array of independent disks (RAID), a tape library, a tape backup, a tape library, a compact disk read only memory (CD ROM) library, and the like.

In one embodiment, the DPS 100 provides data storage and data manipulation services for the clients 110. For example, a client 110 may access data stored on a storage device 170 of a storage subsystem 140 by communicating a request through the network 115, the router 120, the internal network 125, a server 130, and the storage communications channel 150 to a storage controller 160 for the storage device 170. The storage controller 160 may retrieve the data from the storage device 170 and communicate the data to the client 110.

The network 115 connecting the clients 110 and the servers 130 may be selected from a local area network (LAN), a wide area network (WAN), the Internet, an Ethernet network, a token ring network, or the like. The network 115 may comprise one or more nodes that may provide one or more physical and/or logical paths for transferring the data. The internal network 125 and the storage communications channel 150 may be for example a LAN, a WAN, or the like.

In one embodiment, secure data is stored on a storage device 170. The secure data may be stored in secure data blocks of the storage device 170. In one embodiment, the secure data blocks are identified by a secure data identifier. In a certain embodiment, the secure data identifier cannot be modified. Alternatively, the secure data may be stored on a client 110 as will be described hereafter.

An authorized user may access the secure data in the storage device 170 from a client 110. However, an unauthorized user may also find a way to access the secure data in the storage device 170 from a client 110. The embodiments described hereafter provided for auditing of accesses to the secure data, either verifying that the secure data is securely stored or identifying an unauthorized access to the secure data.

Figure 2:
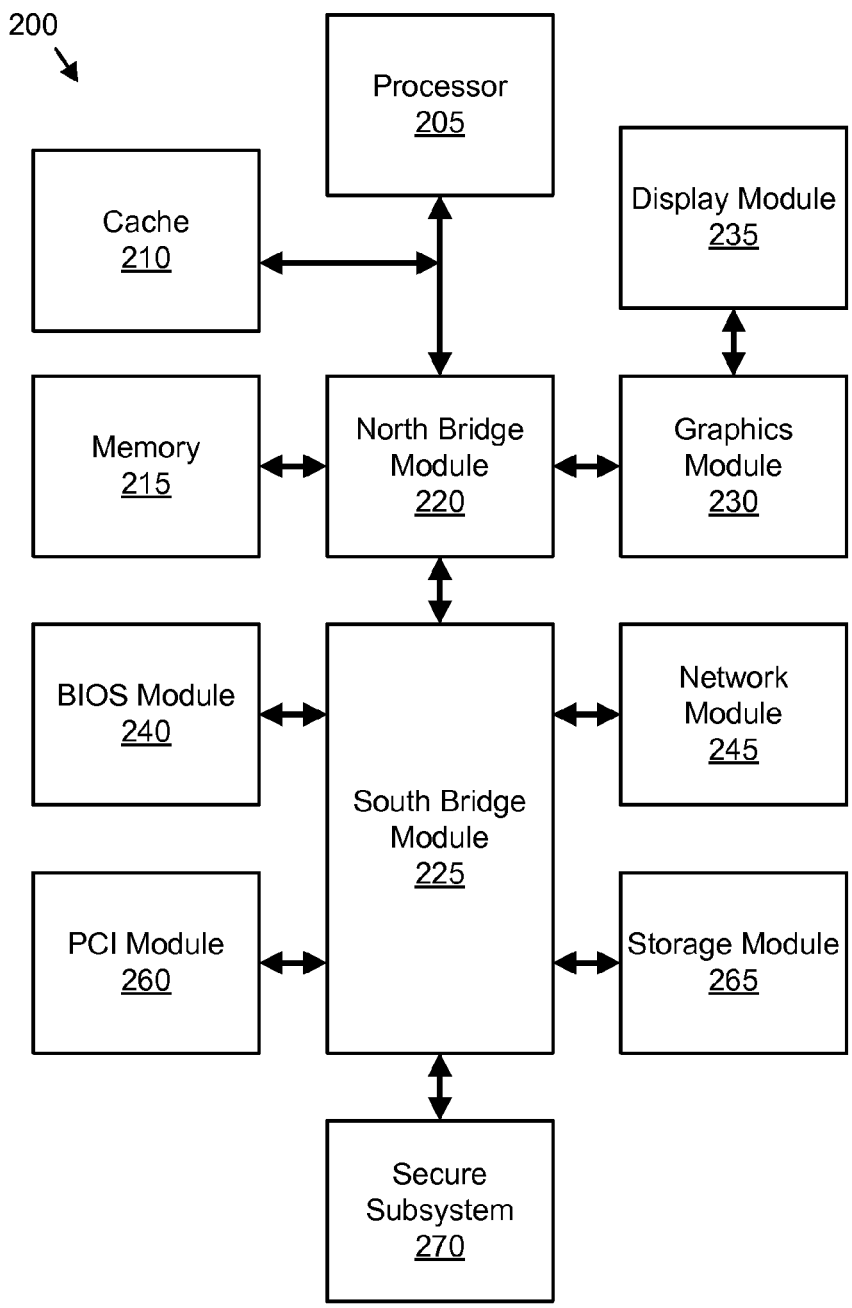
FIG. 2 is a schematic block diagram illustrating one embodiment of a computer.

FIG. 2 is a schematic block diagram illustrating one embodiment of a computer 200. The description of the computer 200 refers to elements of FIG. 1, like numbers referring to like elements. The computer 200 may be a client 110, a server 130, or the like. The computer 200 includes a processor 205, a cache 210, a memory 215, a north bridge module 220, a south bridge module 225, a graphics module 230, a display module 235, a basic input/output system (BIOS) module 240, a network module 245, a peripheral component interconnect (PCI) module 260, a storage module 265, and a secure subsystem 270.

The processor 205, cache 210, memory 215, north bridge module 220, south bridge module 225, graphics module 230, display module 235, BIOS module 240, network module 245, PCI module 260, storage module 265, and secure subsystem 270, referred to herein as components, may be fabricated of semiconductor gates on one or more semiconductor substrates. Each semiconductor substrate may be packaged in one or more semiconductor devices mounted on circuit cards. Connections between the components may be through semiconductor metal layers, substrate-to-substrate wiring, circuit card traces, and/or wires connecting the semiconductor devices.

The memory 215 stores computer readable programs. The processor 205 executes the computer readable programs as is well known to those skilled in the art. The computer readable programs may be tangibly stored in the storage module 265. The storage module 265 may be a hard disk drive, an optical storage device, a holographic storage device, a micromechanical storage device, a semiconductor storage device, or the like.

The processor 205 may communicate with the cache 210 through a processor interface bus to reduce the average time to access memory 215. The cache 210 may store copies of the data from the most frequently used memory 215 locations. The computer 200 may use one or more caches 210 such as a Double Data Rate 2 (DDR2) cache memory or the like.

The north bridge module 220 may communicate with and provide bridging functionality between the processor 205, the graphic module 230, the memory 215, and the cache 210. The processor 205 may be connected to the north bridge module 220 over, for example, a six hundred sixty seven Megahertz (667 MHz) front side bus.

The north bridge module 220 may be connected to the south bridge module 225 through a direct media interface (DMI) bus. The DMI bus may provide a high-speed, bi-directional, point-to-point link supporting a clock rate for example of one Gigabytes per second (1 GBps) in each direction between the north bridge module 220 and the south bridge module 225. The south bridge module 225 may support and communicate with the BIOS module 240, the network module 245, the PCI module 260, and the storage module 265.

The PCI module 260 may communicate with the south bridge module 225 for transferring data or power to peripheral devices. The PCI module 260 may include a PCI bus for attaching the peripheral devices. The PCI bus can logically connect several peripheral devices over the same set of connections. The peripherals may be selected from a printer, a joystick, a scanner, or the like. The PCI module 260 may also comprise an expansion card as is well known to those skilled in the art.

The BIOS module 240 may communicate instructions through the south bridge module 225 to boot the computer 200, so that computer readable software instructions stored on the storage module 265 can load, execute, and assume control of the computer 200. Alternatively, the BIOS module 240 may comprise a coded program embedded on a chipset that recognizes and controls various devices that make up the computer 200.

The network module 245 may communicate with the south bridge module 225 to allow the computer 200 to communicate with other devices over a network. The devices may include routers, bridges, computers, printers, and the like.

The display module 235 may communicate with the graphic module 230 to display information as will be described hereafter. The display module 235 may be a cathode ray tube (CRT), a liquid crystal display (LCD) monitor, or the like.

The secure subsystem 270 may be a Trusted Platform Module compliant secure subsystem. In one embodiment, the Trusted Platform Module compliant secure subsystem complies with a Trusted Platform Module specification published by the Trusted Computing Group. The Trusted Platform Module specification may be Trusted Platform Module specification 1.2 revision 103 published Jul. 9, 2007.

In a certain embodiment, the secure subsystem 270 stores secrets. The secrets may be encrypted with one or more encryption keys. The secure subsystem 270 may also encrypt data, decrypt data, and perform audits of data security.

Figure 3:
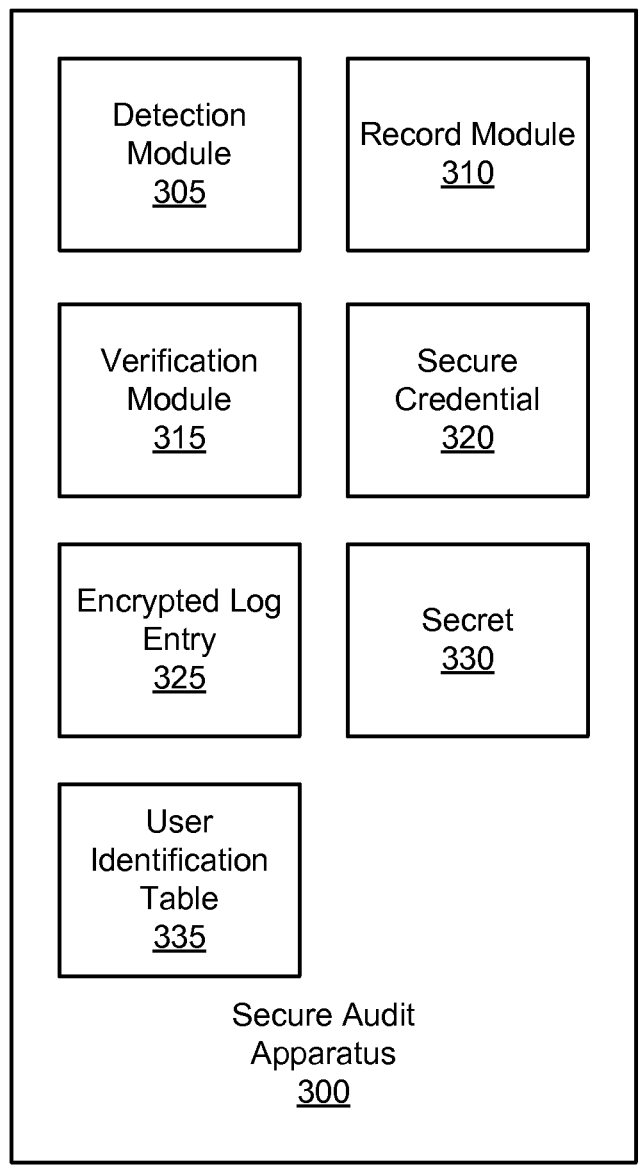
FIG. 3 is a schematic block diagram illustrating one embodiment of a secure audit apparatus.

FIG. 3 is a schematic block diagram illustrating one embodiment of a secure audit apparatus 300. The secure audit apparatus 300 includes a detection module 305, a record module 310, a verification module 315, a secure credential 320, an encrypted log entry 325, a secret 330, and a user identification table 335. The description of the secure audit apparatus 300 may refer to elements of FIGS. 1-2, like numbers referring to like elements.

The detection module 305, record module 310, verification module 315, secure credential 320, an encrypted log entry 325, secret 330, and user identification table 335 may be embodied in a tangible, non-transitory computer readable storage medium. The computer readable storage medium may comprise computer readable program executed by the processor 205. The computer readable storage medium may be the memory 215, the cache 210, the storage module 265, a storage device 170, or the like. In a certain embodiment, the computer readable storage medium is embodied in the secure subsystem 270.

Alternatively, the detection module 305, record module 310, and verification module 315 may be embodied in logic gates of one or more hardware circuits. In a certain embodiment, the detection module 305, record module 310, and verification module 315 are embodied in the computer readable storage medium and the logic gates of one or more hardware circuits.

In one embodiment, the secure credential 320 is a random number. The secure credential 320 may have a specified length, such as 120 bytes. Alternatively, the secure credential 320 may be a user selected password.

The detection module 305 detects an access to secure data. The secure data may be stored on a storage device 170. Alternatively, secure data may be stored in the memory 215, the cache 210, and/or the storage module 265. The detection module 305 detects each access to the secure data. Thus the secure data cannot be accessed without the detection module 305 detecting the access. In one embodiment, the detection module 305 is embodied in a storage controller 160. In an alternate embodiment, the detection module 305 is embodied in the secure subsystem 270. In addition, the detection module 305 may be embodied in a storage device 170, the storage module 265, or the like.

The record module 310 records an encrypted log entry 325 describing the access to the secure data. The log entry 325 may be stored on a storage device 170. Alternatively, the log entry 325 may be stored in the storage module 265. In one embodiment, the log entry 325 is encrypted as a hash of the log entry with the secure credential 320. In a certain embodiment, the log entry 325 is encrypted so that any modification of the log entry is detectable.

The log entry 325 may comprise a user identification, a time stamp, and file name. The user identification may uniquely identify a user of the data processing system 100. For example, a user may login to a client 110 of the data processing system 100 with the user identification and the secret 330. The secret 330 may be a password. Thereafter, the user identification may identify the user to the data processing system 100. Any accesses to the secure data may always include the user identification.

In one embodiment, the user identification table 335 lists user identifications that are authorized to access the secure data. In one embodiment, the secure data comprises multiple portions. A portion may comprise one or more database entries, one or more files, or the like. Each portion may be associated with at least one user identification table 335 specifying the user identifications that are authorized to access the portion.

In one embodiment, the user identification comprises a biometric identification. For example, the user may log in to the data processing system 100 using a biometric identification such as a fingerprint scan, retinal scan, or the like. The user identification may store the biometric identification. Alternatively, the biometric identification may be verified with the secret 330 and the user identification may store a confirmation of the biometric identification verification.

In one embodiment, the log entry 325 identifies a computer process. For example, the log entry 325 may include a process identifier for a database program that accesses the secure data.

The time stamp may identify a time and a date that the user accessed the secure data. In one embodiment, the timestamp also includes a time and a date that the user logged into a session with the data processing system 100. The file name may include metadata describing the secure data accessed by the user. In one embodiment, the file name includes a path to the secure data.

In a certain embodiment, the log entry 325 records all changes to the secure data. For example, if the user modified a credit card number, the log entry 325 may record the change.

The record module 310 may be embodied in the secure subsystem 270. The log entry 325 may be recorded remotely from the secure subsystem 270. For example, if the secure subsystem 270 is embodied in a client 110, the log entry 325 may be stored in a storage device 170 of the data processing system 100.

The verification module 315 verifies the secure data is securely stored. In one embodiment, the verification module 315 determines if the log entry 325 is modified. In addition, the verification module 315 may determine from the log entry 325 if an unauthorized user accessed the secure data.

The verification module 315 verifies that the secure data is securely stored in response to the log entry 325 not be modified and the secure data not being accessed by the unauthorized user. If the secure data is modified or if an unauthorized user has accessed the secure data, the verification module 315 does not verify that the secure data is securely stored. In one embodiment, the verification module 315 may report a security breach. The apparatus 300 audits the secure data to determine if an unauthorized user has accessed the secure data.

Figure 4:
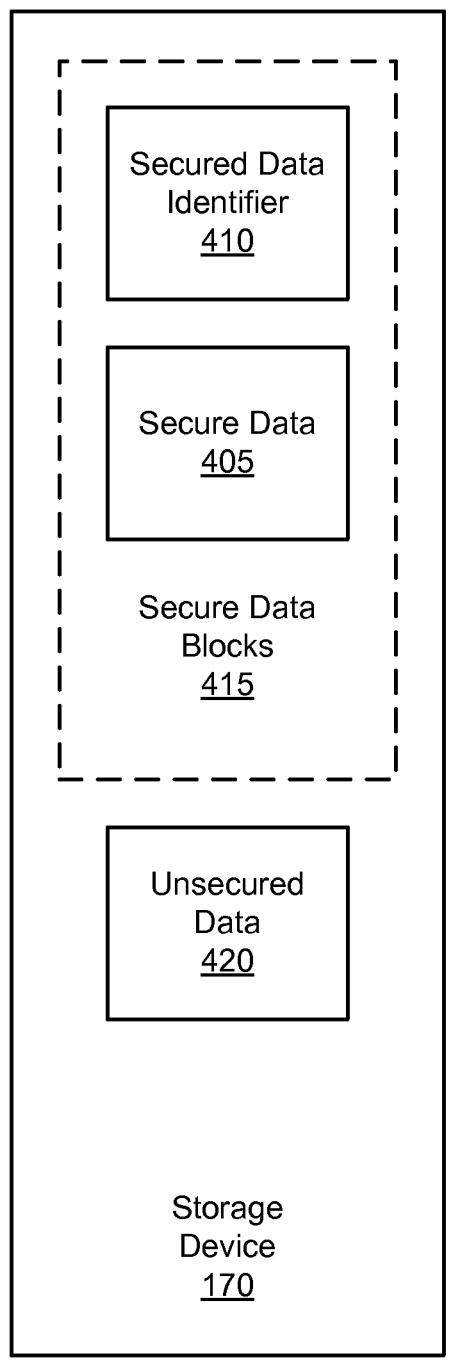
FIG. 4 is a schematic block diagram illustrating one embodiment of a storage device.

FIG. 4 is a schematic block diagram illustrating one embodiment of a storage device 170. The storage device 170 may be the storage device of FIG. 1. Alternatively, the storage device 170 may be the storage module 265 FIG. 2. The description of the storage device 170 refers to elements of FIGS. 1-3, like numbers referring to like elements. The storage device 170 includes secure data blocks 415, secure data 405, a secured data identifier 410, and unsecured data 420.

In one embodiment, the secure device 170 comprises the secure data blocks 415. The secure data blocks 415 may be identified by the secured data identifier 410. The secured data identifier 410 may be written to the secure data blocks 415 by the storage device 170 and/or by a storage controller 160. In one embodiment, the secured data identifier 410 cannot be modified. In an alternate embodiment, modifying the secured data identifier 410 is detected by the detection module 305 and recorded an encrypted log entry 325 by the record module 310. The secure data 405 may only be stored in the secure data blocks 415.

Alternatively, the secure data blocks 415 may be embodied in a secure logical volume. The storage controller 160 may organize both secure logical volumes and unsecured logical volumes. The storage controller 160 may only store the secure data 405 in the secure logical volumes.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 5:
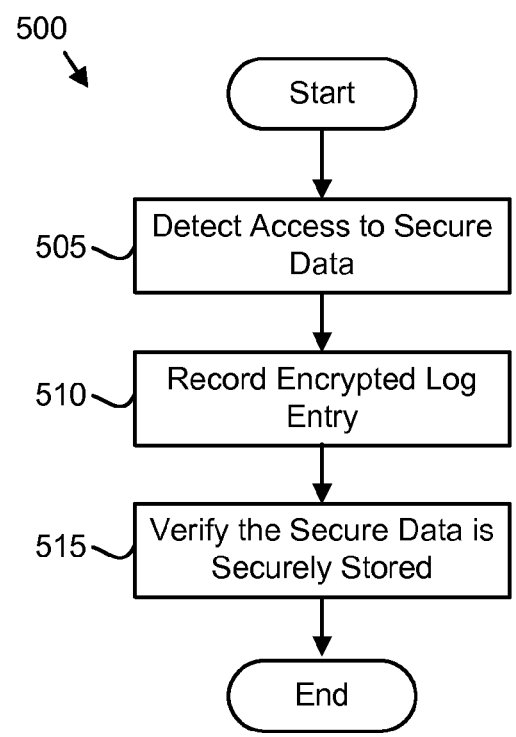
FIG. 5 is a schematic flow chart diagram illustrating one embodiment of a secure audit method.

FIG. 5 is a schematic flow chart diagram illustrating one embodiment of a secure audit method 500. The method 500 substantially includes the steps to carry out the functions presented above with respect to the operation of the described apparatus and system of FIGS. 1-4. The description of the method 500 refers to elements of FIGS. 1-4, like numbers referring to like elements.

In one embodiment, the method 500 is implemented with a tangible, non-transitory computer readable storage medium storing a computer readable program. The computer readable storage medium may be integrated into a computing system, such as the computer 200 or the data processing system 100, wherein the computer readable program executed by the computing system performs the method 500. Alternatively, the method 500 may be implemented by logic gates in one or more hardware circuits.

The method 500 starts, and the detection module 305 detects 505 an access to the secure data 405. In one embodiment, the detection module 305 detects 505 each access to the secure data blocks 415. In a certain embodiment, the detection module 305 looks for the secured data identifier 410 before reading the secure data blocks 415. If the secure data blocks 415 include the secured data identifier 410, the detection module 305 may identify all data stored in a secure data blocks 415 as the secure data 405.

In one embodiment, the storage controller 160 may identify the secure data blocks 415. For example, the storage controller 160 may identify the secure data blocks 415 as a source for a read operation, causing the detection module 305 to detect 505 the access to the secure data 405.

Alternatively, the detection module 305 detects 505 each access to a secure virtual volume. Each secure virtual volume may include the secured data identifier 410. In a certain embodiment, the secured data identifier 410 is included in a logical volume identifier for the secured logical volume.

In one embodiment, the storage controller 160 may identify the secure logical volume. For example, the storage controller 160 may identify the secure virtual volume as the target of a write operation, causing the detection module 305 to detect 505 the access to the secure data 405.

In a certain embodiment, the secure data 405 comprises a plurality of files. Each file may be marked as secure. The detection module 305 detects 505 an access to a file marked as secure as an access to the secure data 405. For example, the detection module 305 may detect 505 an access to a secure file stored on a hard disk drive storage module 265 of the computer 200 as an access to the secure data 405.

In one embodiment, the detection module 305 generates an interrupt in response to detecting 505 the access to the secure data 405. Alternatively, the detection module 305 may call a specified process in response to detecting the access to the secure data 405.

The record module 310 records 510 the encrypted log entry 325 describing the access to the secure data 405. In a certain embodiment, the record module 310 records 510 the encrypted log entry 325 in response to the detection module 305 detecting 505 the access to the secure data 325.

In one embodiment, the record module 310 is activated in response to the interrupt generated by the detection module 305. In an alternate embodiment, the record module 310 is the specified process called by the detection module 305.

In one embodiment, recording 510 the encrypted log entry 325 is embodied in an atomic operation that accesses the secure data 405. For example, a secure read atomic operation may both read the secure data 405 and record 510 the encrypted log entry 325 before the secure read atomic operation completes. Similarly, a secure write atomic operation may both write secure data 405 and record the encrypted log entry 325 before the secure write atomic operation completes.

In one embodiment, the encrypted log entry 325 is recorded 510 remotely. If the log entry 325 is recorded 510 by the record module 310 embodied in the secure subsystem 270, the record module 310 may record for a log entry 325 remotely from the secure subsystem 270. For example, if the secure subsystem 270 of a client 110 records 510 the log entry 325, the log entry 325 may be recorded on a storage device 170 remote from the client 110.

In a certain embodiment, the log entry 325 is recorded 510 remotely from the data processing system 100. For example, the record module 310 may communicate the log entry 325 to a third party data processing system 100 at a remote site, and the third party data processing system 100 may store the log entry 325 in a storage device 170.

The log entry 325 may comprise the user identification, the time stamp, and the filename. In one embodiment, the log entry 325 further comprises a rationale. The rationale may describe a reason the user is accessing the secure data 405. The rationale may be entered by the user.

In addition, the log entry 325 may comprise an authorization. In one embodiment, the authorization specifies the source of the authority for the user's access of the secure data 405. In one embodiment, the authorization identifies a department, an agency, an organization, and the like authorizing the access. Alternatively, the authorization may be evidence of permission from an owner of the secure data 405. For example, the authorization may be a hash of the owner's signature. In a certain embodiment, the authorization is an owner password or personal identification number (PIN). The password or PIN may be encrypted.

The verification module 315 verifies 515 the secure data 405 is securely stored and the method 500 ends. The verification 515 that the secure data 405 is securely stored is further described in the description of FIG. 6. By verifying 515 that the secure data 405 is securely stored, the method 500 supports audits of access to the secure data 405. For example, an organization storing the secure data 405 could verify that the secure data 405 is only accessed by authorized users. In addition, the method 500 supports the identification of accesses that compromise the secure data 405.

Figure 6:
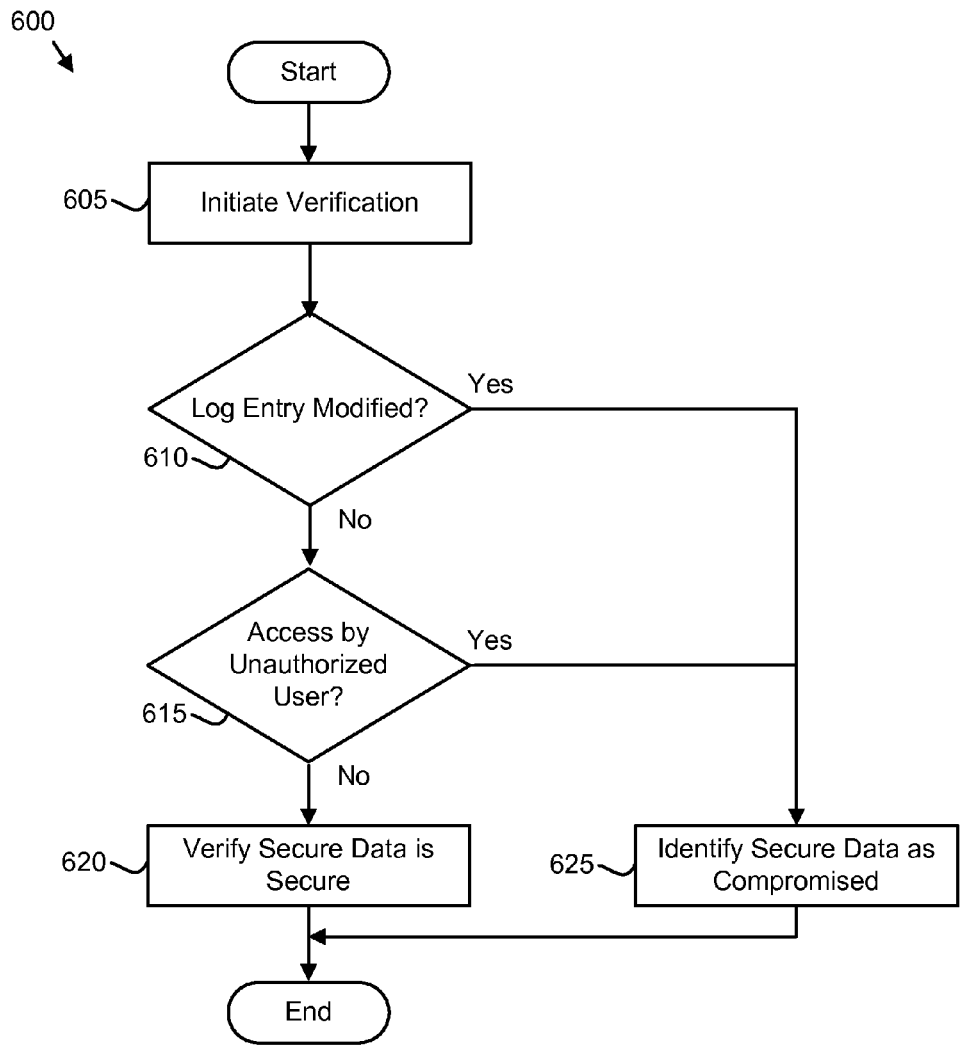
FIG. 6 is a schematic flow chart diagram illustrating one embodiment of a verification method.

FIG. 6 is a schematic flow chart diagram illustrating one embodiment of a verification method 600. The method 600 substantially includes the steps to carry out the functions presented in step 515 of FIG. 5. The description of the method 600 refers to elements of FIGS. 1-5, like numbers referring to like elements.

In one embodiment, the method 600 is implemented with a tangible, non-transitory computer readable storage medium storing a computer readable program. The computer readable storage medium may be integrated into a computing system, such as the computer 200 or the data processing system 100, wherein the computer readable program executed by the computing system performs the method 600. Alternatively, the method 600 may be implemented by logic gates in one or more hardware circuits.

The method 600 starts and in one embodiment, the verification module 315 initiates 605 verification. The verification module 315 may initiate 605 verification in real time. For example, the verification module 315 may initiate 605 verification at a specified time each day. In a certain embodiment, a verification schedule directs the verification module 315 to initiate 605 verification.

In another embodiment, the verification module 315 initiates 605 verification after a specified number of accesses to the secure data 405. For example, the verification module 315 may initiate 605 verification after 10,000 accesses to the secure data 405.

Alternatively, the verification module 315 may initiate 605 verification in response to an audit request. In one embodiment, the verification module 315 may initiate 605 verification as directed by an auditor. The auditor may employ a specified identifier and password to authorize the audit.

In one embodiment, the verification module 315 determines 610 if the log entry 325 is modified. The log entry 325 may be encrypted as a hash of the log entry 325 with the secure credential 320. The verification module 315 may process the log entry 325 to determine if the log entry 325 is modified subsequent to being hashed with the secure credential 320. For example, if the log entry 325 is modified subsequent to being hashed with the secure credential 320, the verification module 315 may determine that the log entry 325 is modified by identifying anomalies in the decrypted log entry 325.

In an alternate embodiment, the verification module 315 determines 610 that the log entry 325 is modified by comparing metadata for the log entry 325 with the time stamp embodied in the log entry 325.

If the verification module 315 determines 610 at the log entry 325 is not modified, the verification module 315 may determine 615 if an unauthorized user accessed the secure data 405. In one embodiment, the verification module 315 decrypts each encrypted log entry 325. In addition, the verification module 315 may compare each user identification in each log entry 325 against the user identifications in the user identification table 335 that are authorized to access the secure data 405. The verification module 315 may determine 615 that an unauthorized user accessed secured data 405 if at least one user identification from the log entries 325 is not listed in the user identification table 335.

If the verification module 315 determines 615 that no unauthorized user accessed the secure data 405, the verification module 315 verifies 620 that the secure data 405 is securely stored in the method 600 ends. The verification module 315 verifies 620 that the secure data 405 is secure in response to the log entry 325 not being modified and the secure data not being accessed by the unauthorized user.

If verification module 315 determines 610 that the secure data 405 is modified or determines 615 that an unauthorized user has accessed the secure data 405, the verification module 315 may identify 625 that the secure data 625 is compromised and the method 600 ends. In one embodiment, the verification module 315 identifies one or more portions of the secure data 405 that are compromised. For example, if a single file of the secure data 405 is compromised, the verification module 315 may mark that single file as compromised.

In one embodiment, the verification module 315 identifies that the secure data 405 is compromised by reporting a security breach. The report may include details of each unauthorized access to the secure data 405. In one embodiment, the verification module 315 automatically communicates the report of the security breach to a third party.

Because each access to the secure data 405 is detected 505 and recorded 510 as encrypted log entry 325, the method 600 can verify 620 in an audit that no unauthorized access of the secure data 405 occurred. Thus the storage of the secure data 405 on the data processing system 100 can be reliably audited.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
 a computer readable storage device storing machine readable code executed by a processor, the machine readable code comprising:

a detection module detecting an access to secure data, wherein the secure data is stored in secure data blocks of a remote storage device and the secure data blocks are identified by a secured data identifier that cannot be modified;

a record module recording an encrypted log entry describing the access to the secure data, the encrypted log entry comprising a log entry encrypted with a hash of the log entry with a secure credential, the log entry comprising a user identification; and a verification module decrypting the encrypted log entry, determining if the log entry is modified from anomalies in the decrypted log entry, determining from the decrypted log entry if an unauthorized user accessed the secure data if the user identification is not listed in a user identification table, and verifying the secure data is securely stored in response to the log entry not being modified and the secure data not being accessed by the unauthorized user.

2. The apparatus of claim 1, wherein the detection module is embodied in a Trusted Platform Module compliant secure subsystem.

3. The apparatus of claim 1, wherein the log entry further comprises a time stamp and a filename.

4. A method comprising:

detecting, by use of a processor, an access to secure data, wherein the secure data is stored in secure data blocks of a remote storage device and the secure data blocks are identified by a secured data identifier that cannot be modified;

recording an encrypted log entry describing the access to the secure data, the encrypted log entry comprising a log entry encrypted with a hash of the log entry with a secure credential, the log entry comprising a user identification;

decrypting the encrypted log entry;

determining if the log entry is modified from anomalies in the decrypted log entry;

determining from the decrypted log entry if an unauthorized user accessed the secure data if the user identification is not listed in a user identification table; and verifying the secure data is securely stored in response to the log entry not being modified and the secure data not being accessed by the unauthorized user.

5. The method of claim 4, wherein a secure subsystem detects the access to the secure data and records the encrypted log entry.

6. The method of claim 5, wherein the secure subsystem is a Trusted Platform Module compliant secure subsystem.

7. The method of claim 5, wherein the encrypted log entry is recorded remotely from the secure subsystem.

8. The method of claim 4, wherein the log entry further comprises a time stamp and a filename.

9. The method of claim 8, wherein the user identification comprises a biometric identifier.

10. The method of claim 8, wherein the user identification is confirmed by a secret.

11. A system comprising:

a remote storage device storing secure data in secure data blocks, wherein the secure data blocks are identified by a secured data identifier that cannot be modified;

a detection module detecting an access to the secure data on the remote storage device;

a record module recording an encrypted log entry describing the access to the secure data stored on the remote storage device, the encrypted log entry comprising a log entry encrypted with a hash of the log entry with a secure credential, the log entry comprising a user identification; and a verification module decrypting the encrypted log entry, determining if the log entry is modified from anomalies in the decrypted log entry, determining from the decrypted log entry if an unauthorized user accessed the secure data if the user identification is not listed in a user identification table, and verifying the secure data is securely stored in response to the log entry not being modified and the secure data not being accessed by the unauthorized user.

12. The system of claim 11, wherein the detection module is embodied in a Trusted Platform Module compliant secure subsystem and the log entry further comprises a time stamp and a filename.

* * * * *